United States Patent [19]

Mallinson et al.

[11] Patent Number: 4,479,784
[45] Date of Patent: Oct. 30, 1984

[54] EYE LINE-OF-SIGHT RESPONSIVE WIDE ANGLE VISUAL SYSTEM

[75] Inventors: Richard B. Mallinson; Richard A. Mecklenborg, both of Binghamton; David L. Peters, Whitney Point; Kadam S. Lakshminarayanasetty, Binghamton, all of N.Y.

[73] Assignee: The Singer Company, Binghamton, N.Y.

[21] Appl. No.: 239,942

[22] Filed: Mar. 3, 1981

[51] Int. Cl.³ .............................................. G09B 9/08
[52] U.S. Cl. ...................................... 434/43; 434/44
[58] Field of Search ............................. 434/43, 44, 34

[56] References Cited

U.S. PATENT DOCUMENTS

| | | | |
|---|---|---|---|
| 2,883,763 | 4/1959 | Schaper | 434/43 |
| 3,462,604 | 8/1969 | Mason | 351/210 X |
| 3,757,040 | 9/1973 | Bennett et al. | 434/34 X |
| 3,787,619 | 1/1974 | Wolff | 434/43 X |
| 4,103,435 | 8/1978 | Herndon | 434/43 |
| 4,246,605 | 1/1981 | La Russa | 434/43 X |
| 4,297,691 | 10/1981 | Kodama et al. | 434/43 X |
| 4,348,186 | 9/1982 | Harvey et al. | 434/44 |

FOREIGN PATENT DOCUMENTS

2039468  8/1980  United Kingdom ................ 434/43

Primary Examiner—William H. Grieb
Attorney, Agent, or Firm—Douglas M. Clarkson; Barry L. Haley; Stephen C. Kaufman

[57] ABSTRACT

Visual system (37) for providing high detail, high resolution imagery anywhere a trainee is looking throughout a wide field of view. An image generation system (38) of visual system (37) accepts inputs from a helmet mounted oculometer system (30) which determines a trainee's instantaneous eye line-of-sight. The image generation system (38) provides a foveal view of high detail, high resolution imagery at the eye line-of-sight. The foveal view is projected on a screen (46) by a foveal projection system (40). The image generation system (38) further provides a peripheral view of low detail, low resolution imagery that is projected on screen (46) by a peripheral projection system (42). The foveal view is merged with the peripheral view by a merge electronics system (44).

6 Claims, 11 Drawing Figures

CONTROL SYSTEM
PRESENT INVENTION

VISUAL SYSTEM
PRESENT INVENTION

FIG. 1
FLIGHT SIMULATOR
(Prior Art)

FIG. 2A
CONTROL SYSTEM
(Prior Art)

FIG. 2B
VISUAL SYSTEM
(Prior Art)

FIG. 3

FIG. 4A
CONTROL SYSTEM
PRESENT INVENTION

FIG. 4B
VISUAL SYSTEM
PRESENT INVENTION

EYE LINE-OF-SIGHT RESPONSIVE WIDE ANGLE VISUAL SYSTEM

TECHNICAL FIELD

The present invention relates to visual systems for use in flight simulation and more particularly to a visual system that provides high detail scene content with high resolution over a wide field of view.

BACKGROUND ART

To obtain a desired realism, many flight simulators, particularly those for fighter and attack aircraft, use visual systems. Such visual systems include an image generation system, e.g., a motion picture projector or computer image generator (CIG) combined with an image display subsystem, e.g., cathode ray tubes (CRTs) or a light valve projector and screen.

For maximum training capability, such visual systems should allow a trainee to see over a wide field of view. Further, the trainee should be able to search for hidden targets and other objects within the field of view, and discriminate one object from another. In effect, the visual system should provide high detail scene content with high resolution of that scene content, throughout the entire field of view.

It is impossible, however, in today's state of the art, to provide a visual system that has these capabilities. Power and bandwidth requirements, as well as cost, for example, preclude using such visual systems in a flight simulator. Recognizing these limitations, the prior art has attempted to work around them by accepting compromises in image generation and/or image display.

A major deficiency of some of the prior art visual systems has been that they conspicuously define or present an object within the field of view. This prevents the trainee from arbitrarily discriminating among similar scene elements or similar targets, as in the real world tactical situation.

For example, some image generation systems provide an austere environment over a wide field of view, at the same time providing high detail and high resolution for particular objects within the field of view. These particular objects thus "stand out" in an unrealistic fashion. This may be called an "oasis of detail" problem.

Other visual systems employ more powerful image generation systems, but present an "oasis of resolution" problem. Here, the background scene content or detail will be greater over the entire field of view. Thus particular objects can be made to blend with the high detail background from the standpoint of image detail. However, if particular objects are presented with a superior resolution with respect to the surrounding high detail background, then an "oasis of resolution" will be created which will catch the trainee's attention in an unrealistic fashion, and prevent him from discriminating objects.

The "oasis of detail" problem and the "oasis of resolution" problem suggest that a need exists for an improved visual system. The present invention provides a visual system that addresses the cited problems and improves upon the prior art visual system by providing high detail scene content with high resolution wherever a trainee is looking throughout a wide field of view. The present invention thus allows the construction of a visual system that eliminates the "oasis of detail" and "oasis of resolution" problems. The apparatus of the present invention provides the desired realism that enables a trainee to interpret varied, complex, and frequently subtle visual cues.

DISCLOSURE OF THE INVENTION

Accordingly, a primary object of the present invention is to provide a visual system that is capable of providing a wide field of view.

Another object of the present invention is to provide such a visual system that is capable of providing high detail scene content throughout a wide field of view.

Another object of this invention is to provide a trainee with high resolution imagery throughout a wide field of view.

It is still a further object of this invention to provide a visual system wherein a trainee may search a wide field of view, arbitrarily define an object within that field of view, and discriminate that object from the background scene content.

In accordance with the present invention, an improved visual system is provided for use in a simulator. The visual system is of the type having a wide field of view and comprises means for projecting a peripheral view in a trainee's peripheral field of view and a foveal view in the trainee's foveal field of view, and means to project the foveal view responsive to the instantaneous eye line-of-sight of the trainee.

In further accordance with the present invention, a visual system is provided for projecting a scene over a wide field of view. The visual system comprises first image generation means for generating a peripheral view and means to display the peripheral view. The visual system also comprises means to instantaneously determine an eye line-of-sight. The visual system further comprises second image generation means for generating a foveal view and means to display the foveal view in response to the eye line-of-sight.

BRIEF DESCRIPTION OF THE DRAWINGS

These and other features of the present invention will be more clearly understood from a consideration of the following description taken in connection with the accompanying drawings in which.

BEST MODE FOR CARRYING OUT THE INVENTION

Figure 1:
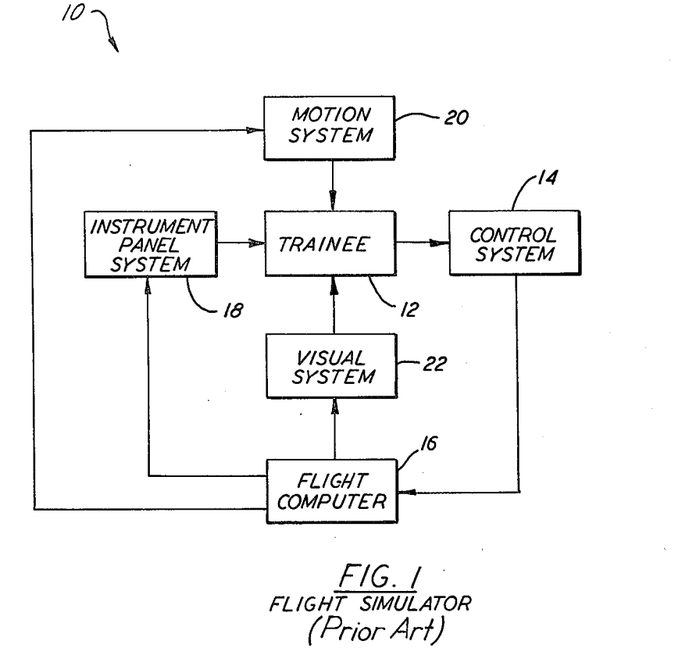
FIG. 1 is a block diagram of a prior art flight simulator.

FIG. 1 is a block diagram of a typical prior art flight simulator 10. In this simulator, a trainee 12 provides control inputs to a control system 14. A flight computer 16 processes the information from the control system 14 and coordinates, in a well-known fashion, appropriate responses by the simulator's instrument panel system 18, its motion system 20 and its visual system 22.

Figure 2A:
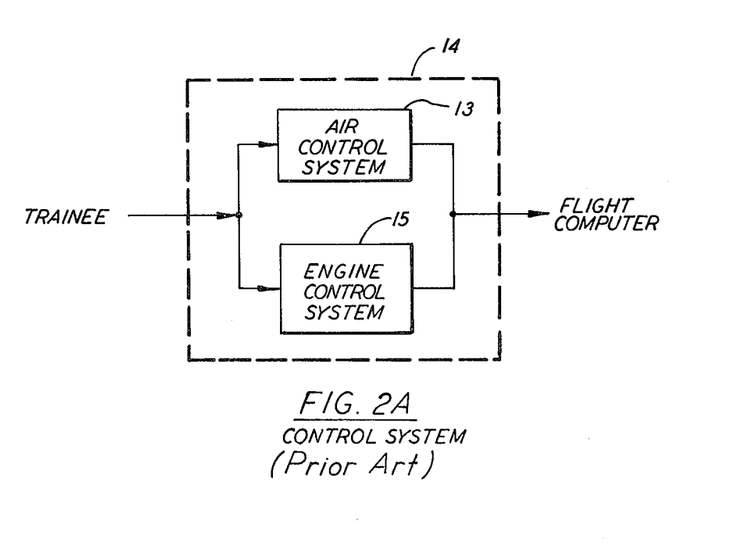
FIGS. 2A, 2B are block diagrams showing details of the control system and visual system of the prior art flight simulator.
Figure 2B:
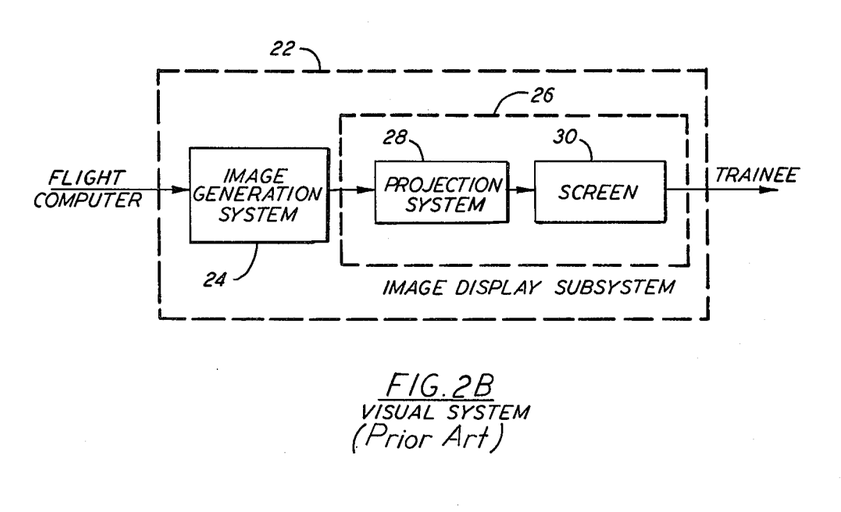

FIGS. 2A, 2B are block diagrams giving further details of this simulator's control system 14 and the visual system 22. In particular, FIG. 2A shows that the control system 14 includes an air control system 13 in parallel with an engine control system 15. The air control system 13 responds to the trainee's manipulations of air control surfaces (rudder, flaps, etc.); the engine control system 15 provides simulated changes in engine speed in response to the trainee's operation of the engine controls.

As depicted in FIG. 2B, the flight computer 16 processes the information from the air control system 13 and the engine control system 15 and inputs this information as control system commands to the visual system 22. The visual system 22 includes an image generation system 24 and an image display subsystem 26. The image display subsystem 26, in turn, includes a projection system 28 for display of an image on a screen 30.

Prior art visual systems as shown in FIGS. 2A and 2B respond to control system inputs which include air control inputs and engine control inputs. However, these prior art visual systems clearly do not have a capability for providing visual system inputs responsive to the instantaneous look position of the trainee's eye line-of-sight within the field of view. Consequently, these systems must assume that the eye could be looking any place within the field of view. Therefore, prior art visual systems, to maximize training objectives, should provide high density, high resolution imagery throughout the entire field of view at all times. The prior art has encountered difficulties in trying to meet these objectives and has therefore sought compromises in the visual system design. These compromises, however, have not satisfactorily solved the "oasis of detail" problem and "oasis of resolution" problem as heretofore described.

It is at this point that the present invention radically departs from the prior art by employing a visual system that receives inputs from a control system that is responsive to the instantaneous look position of the trainee's eye line-of-sight. The present invention selectively provides high detail, high resolution imagery in correspondence with the eye line-of-sight. This approach provides a solution to the "oasis of detail" and "oasis of resolution" problems encountered in the prior art.

The present invention is also distinguished from the prior art because its operation capitalizes on certain characteristics of the human eye. An understanding of these characteristics of the human eye enables the present invention to provide, in a timely fashion, the necessary high detail, high resolution imagery wherever the trainee looks within the field of view.

The characteristics of the human eye which are integral to the present invention are discussed in the articles "Matching Image Resolution to the Eye Resolution" by K. Kraiss and E. Schubert in Society for Information Display '77 Digest, and "The Trajectories of Saccadic Eye Movements" by A. Bahill and L. Stark in Scientific American, January 1979. These characteristics include foveal and peripheral vision, and saccadic movement and visual suppression during a saccade.

Figure 3:
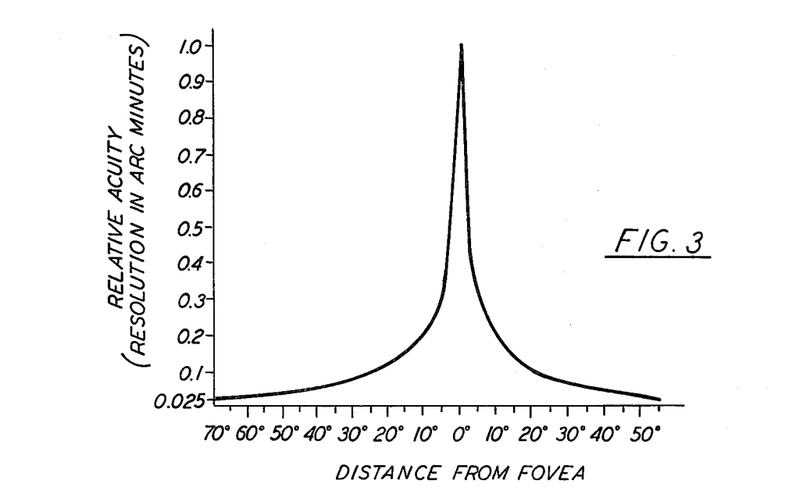
FIG. 3 is a graph of visual acuity as a function of angular displacement from the fovea.

Foveal vision refers to the small area of the center of the retina, approximately 5° in diameter, wherein high detail, high resolution imagery is perceived and differentiated. Peripheral vision, on the other hand, refers to the approximately 180° peripheral area of the retina that extends past the central foveal portion and is sensitive to light and can perceive objects, but can less effectively resolve imagery compared to the foveal vision. FIG. 3 shows this gradual reduction in resolution, or relative visual acuity, as foveal vision gradually extends into peripheral vision. For the purposes of the present invention, a foveal view corresponds to high detail, high resolution imagery that is perceived by foveal vision; a peripheral view corresponds to low detail, low resolution imagery perceived by peripheral vision.

Saccadic movement and visual suppression during a saccade are characteristics of the eye that concern visual acuity combined with eye movement. Visual acuity is maximized when the eye and an object are relatively stationary. In this case, the object is located in the area of central vision, or the fovea, and the eye's ability to resolve the detail of the object is at a maximum. If, however, an object moves with respect to the eye, the eye moves to maintain the object in the fovea. The eye smoothly moves or tracks the object with velocities up to about 100°/sec. At higher velocities, however, even where object movement is smooth, the eye movements occur in small jerks, called saccades. Saccades are, therefore, the eye's attempt to track a specific object and to relocate it in the fovea as it drifts away. Saccades also describe the process by which the eye moves new objects into the fovea for detailed examination.

Saccadic movements for either tracking objects or for moving new objects into the fovea, are accompanied by a suppression of vision. The duration of this visual suppression is dependent in part on the velocity of the eye during a saccade and on the angular displacement between objects. Visual suppression during a saccade is typically on the order of 200 milliseconds.

The characteristics of the eye that include the distinction between foveal vision and peripheral vision, and the accompaniment of saccadic motion by visual suppression during a saccade are utilized in the visual system of the present invention. The present invention detects changes in the instantaneous eye position and uses this information to provide a foveal view or high detail, high resolution image at the next look point. The present invention provides changes in the foveal view which are imperceptible to the eye because the changes are accomplished in a period of time that is less than the interval of visual suppression during a saccade. In accordance with the present invention, no high detail, high resolution imagery is formed in the peripheral regions where it is unnecessary and even wasteful.

Figures 4A, 4B:
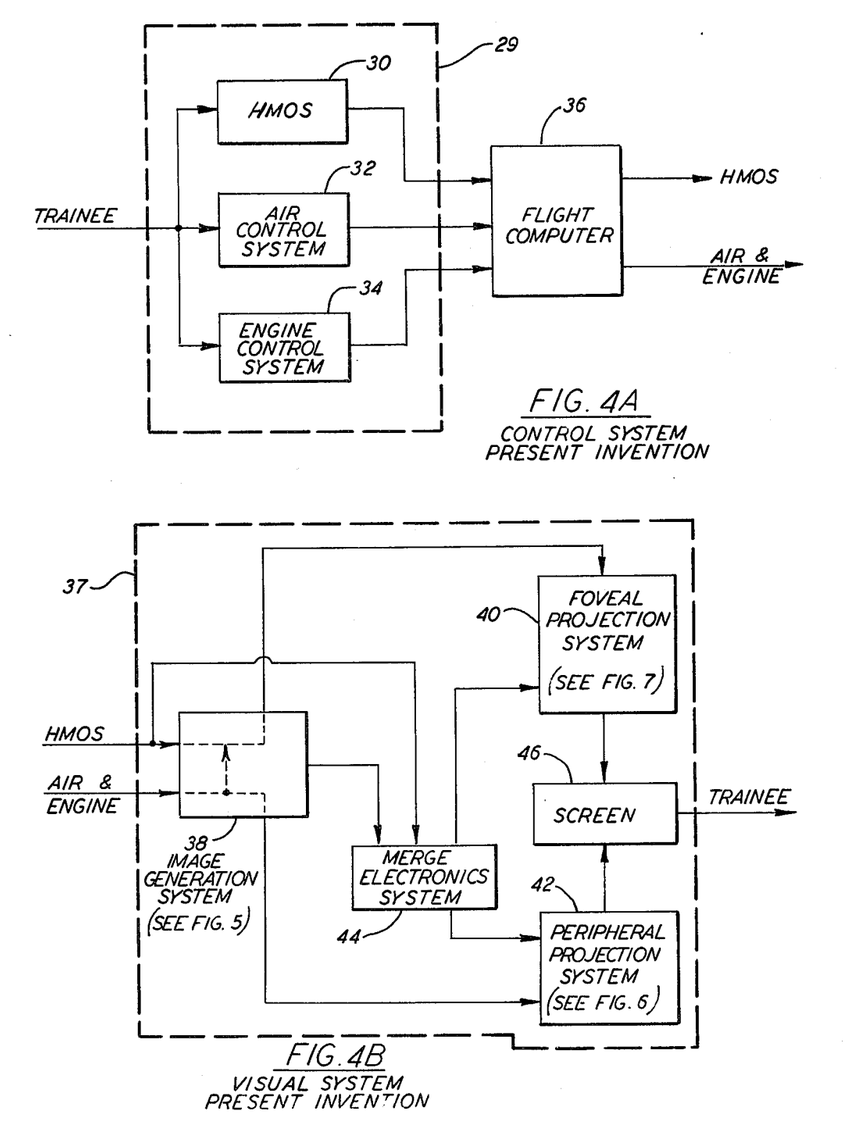
FIGS. 4A, 4B are block diagrams of a control system and a visual system constructed according to the principles of the present invention.

A control and visual system of the present invention is shown in FIGS. 4A and 4B. FIG. 4A shows a control system 29 that is capable of providing visual information, as well as air and engine control information, to a flight computer 36 for input into a visual system 37, shown in FIG. 4B.

In particular, FIG. 4A shows trainee command inputs to a helmet-mounted oculometer system (HMOS) 30 in parallel with an air control system 32 and an engine control system 34. The HMOS 30 locates the trainee's eye direction relative to his helmet, and his helmet direction relative to the simulated cockpit. The resulting total eye direction is inputted to the flight computer 36 so that a foveal view is provided at the trainee's instantaneous eye line-of-sight or look angle. An HMOS that is suitable for this purpose is produced by the Avionics Division of Honeywell Corp., Minneapolis, Minnesota.

In the preferred embodiment, the eye line-of-sight information available from the HMOS 30 as well as the air and engine control information, provide inputs to the visual system 37 through the medium of the flight computer 36. FIG. 4B shows details of the visual system 37. It includes an image generation system 38 which provides inputs to a foveal projection system 40, a peripheral projection system 42, and a merge electronics system 44. The foveal projection system 40 and the peripheral projection system 42 provide inputs to a screen 46. In the preferred embodiment, the screen 46 comprises a segment of the interior surface of a spherical dome.

The aforementioned systems 38, 40, 42 and 44 are interconnected and interdependent. Before describing these relationships, details of these systems taken in isolation will be presented.

Figure 5:
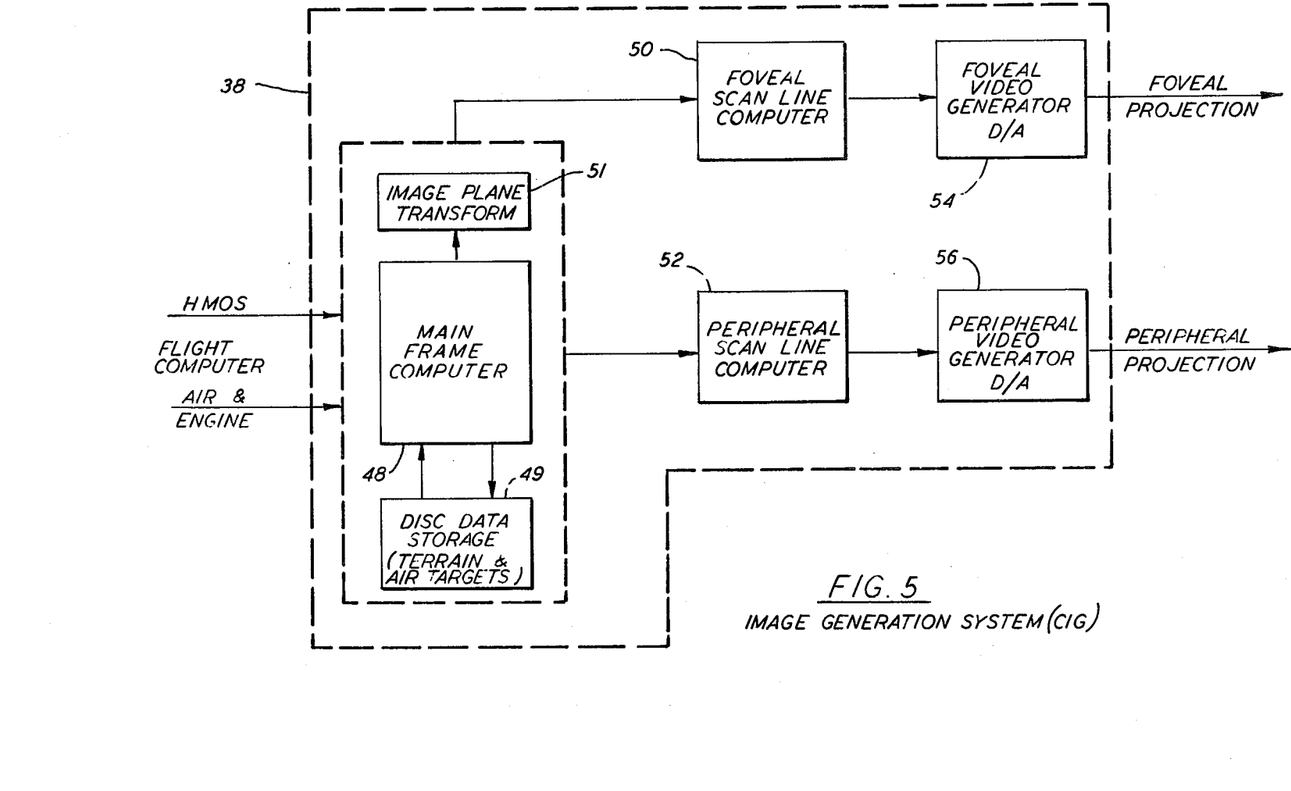
FIG. 5 is a block diagram showing the Image Generation System of the present invention.

Reference to FIG. 5 shows the image generation system 38 which in the preferred embodiment is a Computer Image Generator (CIG). System 38 includes a main frame computer 48 with disc data storage 49. The main frame computer 48 is a conventional computer, such as a Perkin Elmer 8/32. It is capable of simultaneously generating both a foveal view, or high detail, high resolution view, and a peripheral view, or low detail, low resolution view of terrain and air targets.

In the preferred embodiment, the CIG provides a foveal view which concentrates a high detail, high resolution version of terrain and air targets for display onto a 20° field of view. Within this 20° field of view, the CIG provides a foveal view that has an approximately two-arc minute resolution. The resolution gradually degrades to a resolution of 15-20 arc-minutes at the edge of the 20° foveal field of view. The gradual degradation of resolution permits close matching between the resolutions of the foveal and peripheral views and is in correspondence with the visual acuity curve of FIG. 3.

The CIG 38 receives flight computer information based on the HMOS and air and engine system data. This information is used to call up from the disc data storage memory 49 the appropriate terrain and air target displays. The CIG 38 provides a digital, flat image plane representation of the terrain and air target displays. The digital information of the terrain and air target displays conveys the brightness of the display that corresponds to each position of the display. The digital, flat image plane representation of the terrain and air targets must be processed or converted in several ways in order to interface with the foveal projection system 40 and peripheral projection system 42.

CIG information is processed by a foveal scanline computer 50 and a peripheral scanline computer 52. The two scanline computers 50 and 52 facilitate the scanning and sequencing in time of terrain and air target information, in order to prevent erroneous duplication of terrain and air target information from being provided to the foveal and peripheral projection systems.

CIG information that has been processed by the scanline computers 50 and 52 is then fed respectively to a foveal video generator 54 and to a peripheral video generator 56. The video generators 54 and 56 are conventional digital-to-analog converters which convert CIG digital information on brightness to its corresponding analog representation for utilization by the foveal and peripheral projection systems.

The CIG information that has been processed up to this point comprises flat image plane representation of terrain and air targets. Attempts to directly project or map this flat image plane representation of terrain onto a non-linear spherical dome may result in distortions which detract from the realism of the visual system.

The preferred embodiment provides apparatus to correct this distortion. This apparatus is different for the peripheral projection system 42 and the foveal projection system 40. For the peripheral projection system 42, the preferred embodiment employs a Synchronous Universal Raster Electronics (SURE) 58 and a Scan Converter 60, in order to pre-distort the peripheral image. Subsequent projection or mapping of the pre-distorted peripheral image onto the dome provides the appropriate final corrections so that a trainee perceives a non-distorted peripheral view. A discussion of a method and apparatus that provides such corrections is disclosed in U.S. Pat. No. 3,757,040, "Wide Angle Display For Digitally Generated Video Information" to Bennett et al.

Similar pre-distortion corrections are provided for the foveal projection system by employing a CIG hardware program 51 entitled Image Plane Transform.

Figure 6:
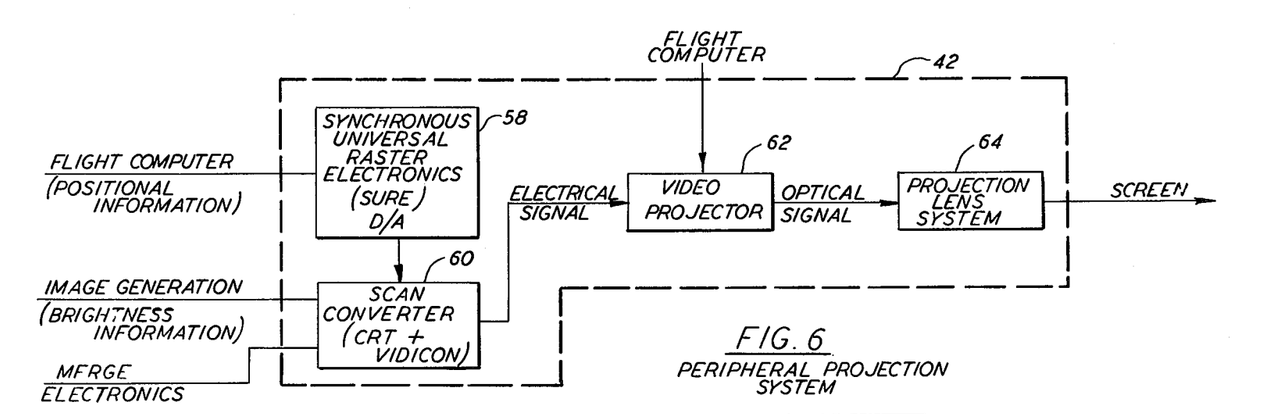
FIG. 6 is a block diagram of the present invention which illustrates the peripheral projection system.

Further details on the peripheral mapping apparatus are provided by FIG. 6 which shows the peripheral projection system 42. With reference to FIG. 6, the SURE 58 is a digital to analog converter which receives positional information of the simulated aircraft from the flight computer 36 and inputs converted positional information into the scan converter 60. The SURE 58 makes appropriate pre-distortion corrections for mapping the flat image CIG positional information onto a spherical dome.

In order to provide a solution to the mapping problem, the positional plus the brightness information outputted by the CIG is temporarily split up, as indicated above. Thus, the positional information portion is routed through the SURE 58 while the brightness information portion is routed through the peripheral video generator 56. The positional information is combined with the brightness information in the scan converter 60. The scan converter 60 includes a conventional cathode ray tube (CRT). The CRT combines the positional and brightness information and outputs an optical signal. This optical signal, in turn, is inputted to a conventional vidicon or camera which outputs an electrical signal for input to a video projector 62.

The video projector 62 receives an electrical signal from the scan converter 60 and outputs an optical signal to a projection lens system 64. The video projector 62 functions to enhance the relatively weak optical signal available from the CRT output. It is noted that distortion problems also occur due to the non-linearity of the mapping of light rays through the linear video projector 62. Corrections for these non-linearities are provided by the SURE 58 and flight computer 36 in a well-known manner. In the preferred embodiment, the video projector 62 comprises a G.E. light valve projector, Model 7150. In other embodiments, not shown, the video projector 62 includes a laser scanner or liquid crystal light valve projector.

The video projector 62 provides an optical signal output which is fed to a conventional wide angle, low resolution projection lens system 64. In the preferred embodiment, the lens system 64 is stationary and provides a field of view approximately 180° circular for projection onto the screen 46.

It was indicated above that corrections for non-linearities in the foveal projection system 40 are provided simply by an Image Plane Transform 51 incorporated in the CIG 48. Hence, the foveal projection system does not need the analog of the peripheral projection system's SURE 58 and the scan converter 60. The simplicity in part derives from the fact that the foveal view is approximately 20° and, therefore is much smaller than the 180° peripheral view. Corrections for non-linearities can therefore be provided by the CIG hardware without the need for external correction apparatus. In alternative embodiments (not shown), correction for non-linearities in the peripheral projection system are also provided in the image generation system, in a manner analogous to corrections made for non-linearities in the foveal projection system.

Figure 7:
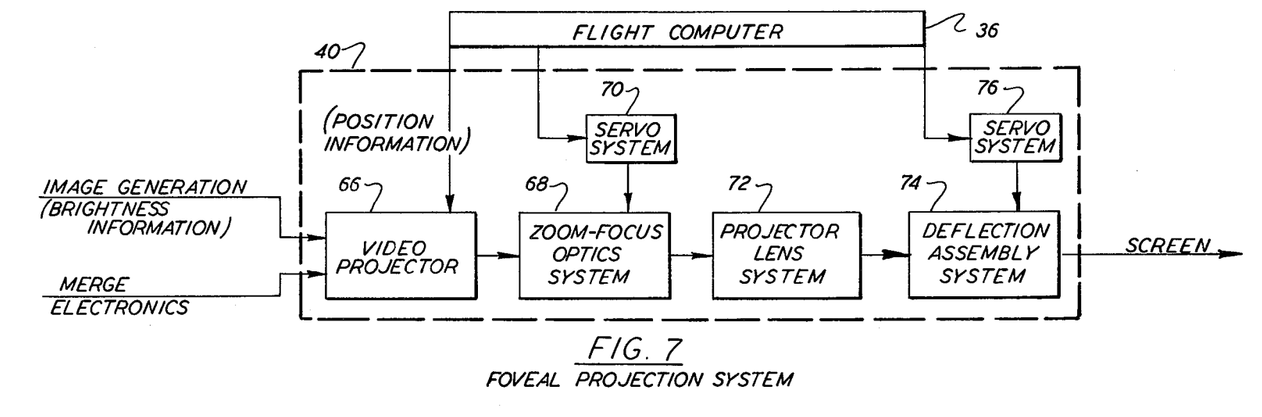
FIG. 7 is a block diagram which shows details of the foveal projection system of the present invention.

Further details of the foveal projection system 40 are shown in FIG. 7. A video projector 66 receives analog electrical inputs of scene brightness from the foveal video generator 54 and positional information inputs from the flight converter 36. The video projector 66 combines these inputs, and then it outputs an optical signal to a zoom-focus optics system 68. In the preferred embodiment, the video projector 66 comprises a G.E. Light valve projector, Model 7150.

The optical signal provided by the video projector 66 is inputted to the zoom-focus optics system 68, which interfaces with a conventional servo system 70. The zoom-focus optics 68 provide corrections for changes in magnification and focusing. The changes derive from the necessity to rotate the foveal projection system in order to provide a foveal view at the ever changing eye line-of-sight of the trainee. Apparatus to provide such changes is described in a co-pending application, entitled Zoom and Focus Projector, by Richard A. Mecklenborg, filed on Dec. 24, 1980, Ser. No. 219,731, and assigned to the same assignee as the present invention.

The corrected optical signal that is provided by the zoom-focus optics system 68 is inputted into a projection lens system 72 which is a conventional narrow angle, high resolution system. It provides an approximately 20° field of view that is inset into the low-resolution peripheral view.

Since the projection lens system 72 is typically very heavy, it can not easily rotate. In order, therefore, to track the very rapid shifts of the trainee's eye line-of-sight, a light beam deflection assembly system 74 driven by a servo system 76 is employed. The deflection assembly system 74 includes the projection lens system 72 in combination with a deflection assembly (e.g., rotating mirror) which projects the foveal image onto the dome in coincidence with the trainee's point of observation. The operation of a suitable deflection assembly system is described in a co-pending application entitled Projector Elevation and Azimuth Tilter, by Robert Klemm et al., filed on Dec. 24, 1980, Ser. No. 219,730 and assigned to the same assignee as the present invention.

The foveal projection system 40, heretofore described, provides changes in the visual scene which are imperceptible to the eye. The changes are consequently provided within a time period that is less than that of visual suppression. It follows that mechanical operation of all the components of the foveal projection system, i.e., the zoom-focus optics system, the servo system, the deflection assembly system, etc., should proceed within a time span appreciably less than that of visual suppression. Operation of the foveal projection system beyond this time constraint will produce unacceptable blurs in the foveal image.

The foveal projection system 40 provides high detail, high resolution imagery within an approximately 20° field of view that is inset into the low detail, low-resolution peripheral view. Apparatus for merging the foveal view into the peripheral view in such a way that the blending is smooth, is provided by a merge electronics system 44, shown in FIG. 4B.

The system 44 accepts inputs on eye position from the flight computer 36 and inputs on brightness information from the image generation system 38. This system 44 insets the foveal view within the peripheral view by effectively blanking out the brightness of the peripheral view at the center of the foveal view, and by blanking out the brightness of the outer boundaries of the foveal view.

Figure 8:
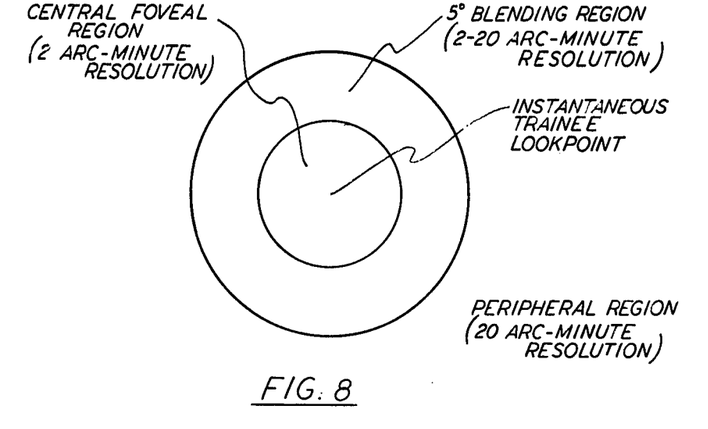
FIG. 8 is a representation of the insetting of a foveal view in a peripheral view.

In the preferred embodiment, the merge electronics system 44 blanks out the peripheral view and insets the foveal views in a gradual, blending manner, illustrated in FIG. 8. Thus, the system 44 creates a peripheral view of full brightness beyond a 10° diameter from the center of the projected foveal view, and a gradually fading peripheral image from a 10° to 5° diameter from the center of the projected foveal view, reaching a fully blanked valve at a 5° diameter. At the same time, the system 44 creates a counterpart to peripheral view brightness rolloff, by decreasing the full brightness of the foveal view at a 5° diameter from the foveal view center to zero brightness at a 10° diameter from the foveal view center.

Figure 9:
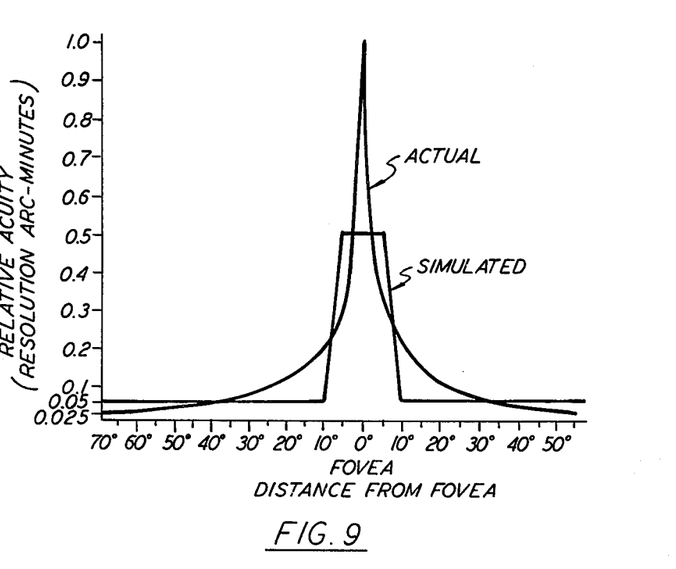
FIG. 9 shows a simulated visual acuity curve superimposed on a visual acuity curve.

The combined peripheral view and foveal view provided by the merge electronics system 44, is shown in graph form in FIG. 9. FIG. 9 shows the simulated visual acuity curve provided by the present invention, as set against the actual eye visual acuity curve reproduced from FIG. 3. The simulated curve represents a good approximation to actual eye capabilities.

The visual system heretofore described is a canonical system that provides a trainee high detail, high resolution imagery over a segment of a spherical dome. It will be obvious to those skilled in the art that the field of view may be extended over an entire spherical dome, through appropriate duplications of video processing equipment, projectors, etc. (not shown).

The present invention represents an advance over the prior art because it provides high detail, high resolution imagery, anywhere a trainee is looking throughout a wide field of view. The present invention, therefore does not need to make compromises of the type which present conspicuous targets to a trainee and thus do not enable *him* to arbitrarily define and discriminate targets from unimportant visual information. The present invention is, therefore, particularly suitable in the field of simulation.

Although specific embodiments of the invention have been described herein, it will be obvious to those skilled in the art that various modifications may be made without departing from the spirit of the invention. With the foregoing in mind, it is understood that the invention is intended to be limited solely by the appended claims.

We claim:

1. In a simulator, a visual system for generating a high-resolution visual image over a wide field of view comprising:
   image display means;
   computer image generator;

means connected to said computer image generator for projecting a visual image of high resolution onto said image display means, the area of said high resolution image being sized to accommodate the foveal viewing area of an observer observing said image display means;

means connected to said computer image generator for projecting a visual image of low resolution onto said image display means encompassing said high-resolution image and sized to accommodate the peripheral viewing area of said observer;

means for merging said high resolution image and said low-resolution image to enhance the optical realism of the overall image, both foveal and peripheral views of the observer;

means for continuously locating the observer's eye line-of-sight relative to a position on said image display means; and means for continuously positioning the high resolution image substantially at the observer's eye line-of-sight on said display means such that the high resolution image will be encompassed in the foveal viewing area of the observer regardless of where the observer is looking, the transition time of repositioning the high-resolution image from one point on said image display means to another point on the image display means being less than the saccadic suppression time of the observer.

2. A visual system as in claim 1, including:

said low-resolution projection means being fixed relative to said image display means, said high-resolution image projection means including a means for moving the image about the image display means in azimuth and elevation.

3. A visual system as in claim 2, wherein:

said image display means includes a portion of a spherical concave screen, said system including a scan conversion means for eliminating image distortion on said concave spherical screen connected to said computer image generator.

4. A visual system as in claim 1, wherein:

said means for continually locating the observer eye line-of-sight relative to a position on said image display means includes an eye-tracking means, a helmet, a means for tracking the eye line-of-sight of an observer wearing the helmet relative to the helmet, and a means connected to the helmet for measuring the relative movement and attitude of said helmet relative to a predetermined image display means whereby the information of the eye line-of-sight of an observer wearing the helmet, relative to the helmet, and the helmet's relative position and attitude will provide information for continuously locating the observer's eye line-of-sight relative to a position on said image display means.

5. A visual system as in claim 1 wherein said foveal high-resolution projection means includes:

means for providing zoom focus optics to said high-resolution image;

means for providing deflection of said projected image in azimuth and elevation including a servo means for moving said deflection assembly means in azimuth and elevation whereby the foveal projection means can focus and move the high-resolution image faster than the saccadic suppression of the observer.

6. A visual system for a simulator, said visual system employing a computer image generator for providing a visual image of high resolution to an observer over a wide field-of-view comprising:

an image display screen;

a computer image generator;

first visual image projector connected to said computer image generator for projecting a visual image of high-resolution (less than 4 arc minutes) onto said display screen, the displayed image sized in area to correspond to the viewable foveal area of an observer observing said display screen; second image projector for projecting a low-resolution image onto said display screen over a wide field of view, said second image projector being fixed relative to said display screen, said second image projector connected to said computer image generator;

means for moving said high-resolution projected image about said display screen; means for tracking the head and eye movements of said observer relative to said display screen and connected to said first image projector so that the location of the intersection point of the eye line-of-sight of the observer on the screen is determined;

merge electronic means coupled to said computer image generator and said first and second image projector for merging said high-resolution image over said low-resolution image in correspondence to the location of the high-resolution foveal sized image so that the high-resolution image and the low-resolution image can be optically blended in uniformity and appearance such that the observer does not perceive distinctions between the high and low-resolution images;

means for moving the high-resolution foveal image into registration with the intersection point of the eye line-of-sight of said observer on said display screen such that the high-resolution image will be continually positioned and displayed about the eye line-of-sight contact point of the observer on the display screen; and means for changing the image of high resolution in the foveal area in accordance with changes in the observer's eye line-of-sight contact point on the display screen such that the high-resolution image, when changed from one location to another by movement of the observer's eye line-of-sight, is changed faster than the saccadic suppression of the observer when moving the eye line-of-sight between points such that the observer cannot detect transition of the high-resolution image from one location to the other.

* * * * *